O. A. SMITH.
NUT TAP.
APPLICATION FILED JAN. 21, 1911.
1,033,836.
Patented July 30, 1912.
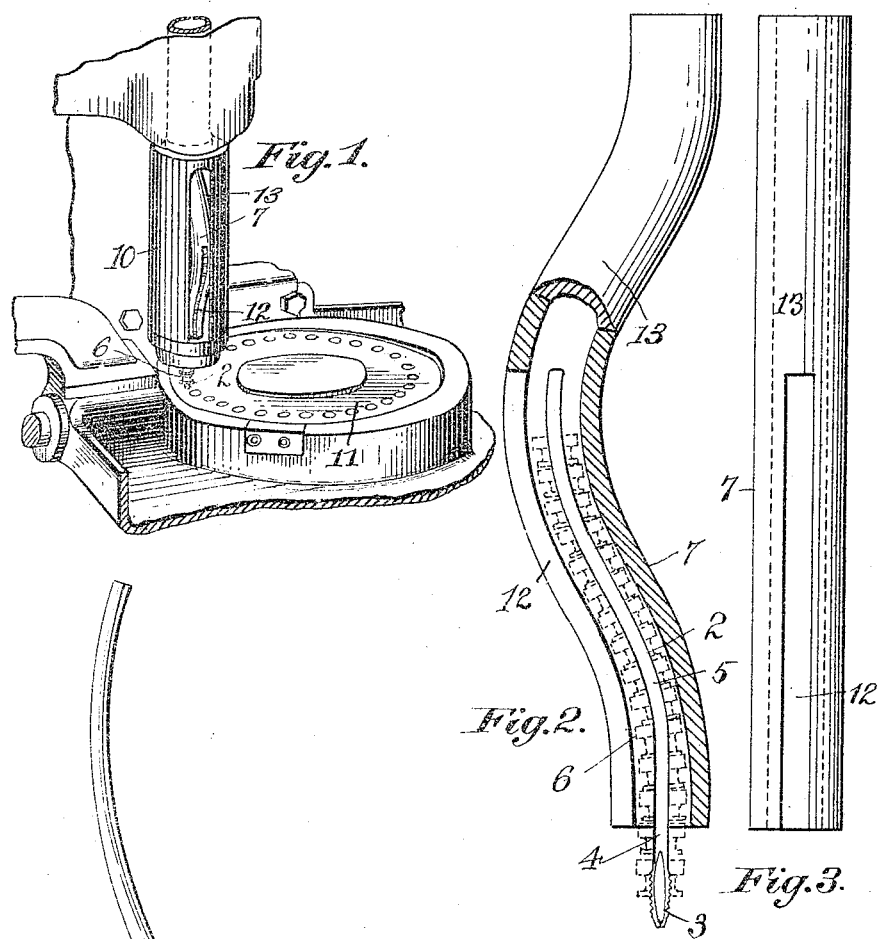
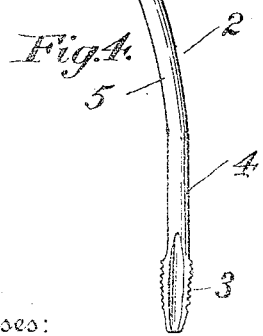
Witnesses:
R. W. Pittman
George F. Purcell
Inventor
Oscar A. Smith
By his Attorney
F. Mead

UNITED STATES PATENT OFFICE.

OSCAR A. SMITH, OF CLEVELAND, OHIO, ASSIGNOR TO THE NATIONAL-ACME MANUFACTURING COMPANY, OF CLEVELAND, OHIO, A CORPORATION OF OHIO.

NUT-TAP.

1,033,836.  Specification of Letters Patent.  Patented July 30, 1912.

Application filed January 21, 1911. Serial No. 603,811.

*To all whom it may concern:*

Be it known that I, OSCAR A. SMITH, a citizen of the United States, residing at Cleveland, in the county of Cuyahoga and State of Ohio, have invented certain new and useful Improvements in Nut-Taps, of which the following is a specification.

This invention relates to nut taps, the object of the invention being to provide an improved tap supported and held by the nuts thereon after the tapping operation and before delivery from the discharge end of the tap, and which is so constructed that the friction of the nuts passing along the tap is very materially decreased while the strength of the tap is materially increased, and in which the cost of manufacture as well as the time necessary to set the tap are also decreased.
I am aware that taps having curved or deflected portions terminating in alined straight portions have been patented, and the present construction of tap is an improvement over this style of tap. In taps having deflected portions there are three essential things to be taken into consideration: First, the friction or rub on the interior of the nut after passing over the threaded head or portion of the tap, and also the rub or friction on the exterior of the holder. Second, the curve or bend of the tap, for the larger the curve the stronger will be the tap. And third, the length of the tap, a short tap not only resulting in a saving in material, but also in the time and labor in manufacturing the same, as well as the time in setting the tap in the machine. In taps of the style having both ends in alinement with a center deflected to form a compound curve each nut as it passes over the threaded portion of the tap comes into contact with the first nut on the shank or plain portion of the tap, making it necessary to force back all of the nuts ahead of it on the shank to make room for itself, thereby causing considerable friction, this friction being greatest at the points where the tap curves into the straight portions thereof and at a point intermediate these points, and this friction must be overcome by the last thread of the nut passing over the threaded portion of the tap, thus increasing the liability of spoiling the last thread of the nut blank because of increased friction and strain. But by providing a tap with a large circular curve and terminating in one straight portion only, and that carrying the threads, the friction of the nut passing over the shank is very little more than if the shank were straight, in view of the fact that the curve is so large that several nuts receive the strain, so that the danger of cocking or tipping is greatly eliminated; it being possible to fit nuts much closer in a holder using the present improved tap, since there is no liability of the nuts sticking at turns or curves as in the case of taps made up of several deflected portions, or of taps having deflected portions terminating in straight portions at its ends, such sticking of the nuts being greater if the nut blanks are long, which would necessitate a much longer length of tap in proportion, whereas in the present improved form of tap all of these disadvantages are eliminated, since there are no sharp angles and the nut blank is free to travel without danger of cramping, thus avoiding the spoiling of the last thread of a nut blank that is about to pass from the threaded portion of the tap. Furthermore, the large circular curve of the present form of tap, without any straight portion at its discharge end, gives a powerful driving force and distributes the driving strain all along the tap, thus making the present improved form of tap much stronger than those heretofore provided. In other words, by forming the tap with a single straight portion carrying threads terminating in a single curved portion of relatively large circular curvature the nut blanks are readily forced along the tap shank with very little additional friction over a straight shank tap, while the advantage of utilizing the nuts as the driving means in a curved form of tap is still obtained.

In the drawings accompanying and forming part of this specification, Figure 1 illustrates a part of a machine in which this improved tap may be operated; Fig. 2 illustrates a holder for the tap, the same being shown partly in section with the tap and the nut blanks located therein; Fig. 3 is a front view of the holder; and Fig. 4 is a view of the tap.

Similar characters of reference indicate corresponding parts throughout the figures of the drawings.

In the present improvement the tap 2 comprises a threaded end or head 3 having a straight portion or shank 4 terminating in a curved or deflected portion 5 of large circular curvature, which constitutes the crank by means of which, through the medium of the nuts 6, the tap is rotated, and for the purpose of rotating this tap the same is mounted in a tubular holder 7 inclosing the tap and having at its inclosing part the same formation as the tap, this holder being of larger diamter than the tap so as to provide proper room for the passage of the nuts along the shank of the tap, and of greater length, as at 13, to properly guide the nuts. By rotating the holder the tap is rotated through the medium of the nuts intermediate such tap and the holder in a manner which will be readily understood, and for the purpose of rotating this holder some suitable means will be provided. In the present instance this holder is shown supported in a slotted spindle or sleeve 10 vertically supported and driven by some suitable driving means, the nut blanks being fed to the tap by means of a turn table 11.

The mechanism for supporting and rotating the holder, and in the present case for imparting reciprocatory or lengthwise movement to the tap, and for feeding the nut blanks to the tap will constitute the subject-matter of a separate application, and it is therefore not claimed herein.

From the foregoing it will be observed that the tap has but one deflected or curved portion forming the crank for rotating it, and but one straight portion terminating in the threaded end of the tap, and that this curved or deflected portion has a large circular curve terminating at the discharge end of the tap, so that there is no opportunity by reason of successive deflected portions or successive curved portions at either end of the tap for materially increasing the friction of the nut blanks and cramping the same during their passage along the tap, and consequently the nut blanks will readily pass along the tap and be discharged therefrom quickly, without cramping of the nut blanks or materially increasing the friction thereof on the tap, so that the mutilation or spoiling of the last thread of each blank as it passes from the threaded end of the tap is avoided, while at the same time the tap may be made very much shorter and its strength materially increased and the driving strain equally distributed all along the tap. It will also be observed that the threaded end of the tap and the curved end thereof are out of alinement, so that, as stated, there are no sharp angles around which it is necessary that the threaded nuts should pass.

In practice the tubular holder will be slotted, as at 12, thereby to permit ready access to the passing nuts if for any reason this is necessary, and also for the purpose of permitting the proper setting and adjustment of the tap, especially in those cases where the nuts are comparatively small and the diameter of the holder would be somewhat smaller than that shown herein.

I claim as my invention:

1. A nut tap having a threaded end merging into and terminating in a curved discharge end extending in the same general direction as said threaded end.

2. A nut tap having a single straight threaded end merging into and terminating in a single large circularly curved portion extending in the same general direction as said threaded end.

3. A nut tap having a threaded end and a discharge end extending in the same general direction as the threaded end but out of alinement therewith, said ends connected by a single curved portion.

4. A nut tap having a straight threaded end merging into and terminating in a curved discharge end extending in the same general direction as the straight threaded end but out of alinement therewith.

5. A nut tap having a threaded end merging into a compound curve shank, the discharge end of the tap terminating with the curved end of the shank.

6. A nut tap extending in the same general direction and having opposite end portions out of the same axial line and an intermediate deflected curved portion merging into said end portions.

7. A nut tap extending in the same general direction and having opposite end portions out of the same axial line and an interminate curved deflected portion merging into said end portions.

Signed at Cleveland Ohio this 18th day of January, 1911.

OSCAR A. SMITH.

Witnesses:
A. E. HENN,
W. E. NORTHCOTT.

Correction in Letters Patent No. 1,033,836.

It is hereby certified that in Letters Patent No. 1,033,836, granted July 30, 1912, upon the application of Oscar A. Smith, of Cleveland, Ohio, for an improvement in "Nut-Taps," an error appears in the printed specification requiring correction as follows: Page 2, lines 105–106, for the word "interminate" read *intermediate;* and that the said Letters Patent should be read with this correction therein that the same may conform to the record of the case in the Patent Office.

Signed and sealed this 17th day of September, A. D., 1912.

[SEAL.]

C. C. BILLINGS,

*Acting Commissioner of Patents.*